United States Patent
Karlinger

(10) Patent No.: US 6,935,804 B2
(45) Date of Patent: Aug. 30, 2005

(54) CLAMPING ELEMENT AND DEVICE FOR FIXING CAM RAILS

(75) Inventor: Stefan Karlinger, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 10/051,605

(22) Filed: Jan. 16, 2002

(65) Prior Publication Data

US 2002/0098035 A1 Jul. 25, 2002

(30) Foreign Application Priority Data

Jan. 20, 2001 (DE) .......................................... 101 02 528

(51) Int. Cl.[7] .................................................. F16B 9/00
(52) U.S. Cl. ........................ 403/252; 403/256; 403/257
(58) Field of Search .......................... 403/22, 189, 252, 403/264, 254–257, 322.1, 321, 343, 381, 383, 387; 52/235; 411/84, 85

(56) References Cited

U.S. PATENT DOCUMENTS

| | | | | |
|---|---|---|---|---|
| 2,676,680 A | * | 4/1954 | Kindorf ........................ | 403/22 |
| 2,784,812 A | * | 3/1957 | Kindorf ........................ | 403/22 |
| 3,053,355 A | * | 9/1962 | Attwood ....................... | 403/22 |
| 3,208,560 A | * | 9/1965 | Cote ........................... | 403/252 |
| 3,813,179 A | * | 5/1974 | Priest .......................... | 403/348 |
| 4,408,928 A | * | 10/1983 | Steinke ........................ | 403/320 |
| 4,430,019 A | * | 2/1984 | D'Alessio ................. | 403/409.1 |
| 4,784,552 A | * | 11/1988 | Rebentisch .................. | 411/85 |
| 4,881,296 A | * | 11/1989 | Marinoni ..................... | 16/237 |
| 5,067,863 A | * | 11/1991 | Kowalski ..................... | 411/85 |
| 5,116,161 A | | 5/1992 | Faisst | |
| 5,839,787 A | | 11/1998 | Magnuson et al. | |
| RE36,681 E | * | 5/2000 | Rinderer ...................... | 411/85 |
| 6,331,092 B1 | * | 12/2001 | Linger ......................... | 403/382 |
| 6,438,913 B1 | * | 8/2002 | Ishikawa et al. .............. | 52/235 |
| 6,478,501 B1 | * | 11/2002 | Kahl ........................... | 403/255 |

FOREIGN PATENT DOCUMENTS

| | | | |
|---|---|---|---|
| DE | 38 19 609 A1 | * 12/1989 | |
| DE | 41 08 175 | 11/1992 | |
| EP | 0 343 942 | 11/1989 | |
| FR | 2 639 411 | * 5/1990 | .................. 411/84 |

* cited by examiner

Primary Examiner—Robert J. Sandy
Assistant Examiner—Ruth C. Rodriguez
(74) Attorney, Agent, or Firm—McGlew and Tuttle, P.C.

(57) ABSTRACT

A clamping element with a sliding block is provided for fixing in an undercut groove with a narrower insertion area and a wider groove base, as well as a device for fixing cam rails to a machine part, with a clamping element having the sliding block and with grooved rails having the undercut grooves. The vertical spacing of two second parallel side surfaces of the sliding block corresponds to the width of the undercut groove base. There is a blocking member connected to the sliding block. The dimension a1 or b1 generally being selected with a reduction within the tolerance range compared with the dimensions a or b. The blocking member may have a stop face for a cam rail and in particular the blocking member may have a groove for the positive lateral fixing of a cam rail. An area corresponding to the blocking member can also be constructed in one piece on a cam rail.

9 Claims, 4 Drawing Sheets

CLAMPING ELEMENT AND DEVICE FOR FIXING CAM RAILS

FIELD OF THE INVENTION

The invention relates to a clamping element with a sliding block for fixing in an undercut groove with a narrower insertion area and a wider groove base, as well as a device for fixing cam rails to a machine part, with a clamping element having the sliding block and with grooved rails having the undercut grooves.

BACKGROUND OF THE INVENTION

Known sliding blocks are rectangular and in particular square, the perpendicular spacing of the side walls or surfaces of the sliding block, in the case of a rectangular cross-section the smaller groove base width dimension, corresponds to the groove in a grooved rail. It is consequently necessary to mount the sliding block in a groove from the end face of the grooved rail, which requires considerable time and effort.

The problem of the invention is consequently to so further develop a clamping element and a device of the aforementioned types, that a simple possibility is provided for inserting the sliding block in an undercut groove with secure and reliable fixing possibilities.

SUMMARY OF THE INVENTION

According to the invention, in the case of a clamping element and a device of the aforementioned type, the set problem can be solved by a parallelogram shape of the sliding block.

Thus, the dimensions of the sliding block can be chosen in such a way that on the one hand it can easily be inserted through the insertion area of the groove perpendicular to the extension direction thereof into the area of the groove base and on the other engages with side walls with parallel orientations thereof on the side walls of the groove base, so as to permit a reliable orientation and fixing.

According to a preferred development, the vertical spacing of two second parallel side surfaces of the sliding block corresponds to the width of the undercut groove base and in particular in that there is a blocking member connected to the sliding block, the dimension a1 or b1 generally being selected with a reduction within the tolerance range compared with the dimensions a or b. According to a further development, the blocking member has a stop face for a cam rail and in particular the blocking member has a groove for the positive lateral fixing of a cam rail. An area corresponding to the blocking member can also be constructed in one piece on a cam rail.

BRIEF DESCRIPTION OF THE DRAWINGS

Further advantages and features of the invention can be gathered from the claims and the following description of an embodiment of the invention with reference to the attached drawings, wherein show:

DETAILED DESCRIPTION OF THE DRAWINGS

Figure 1:
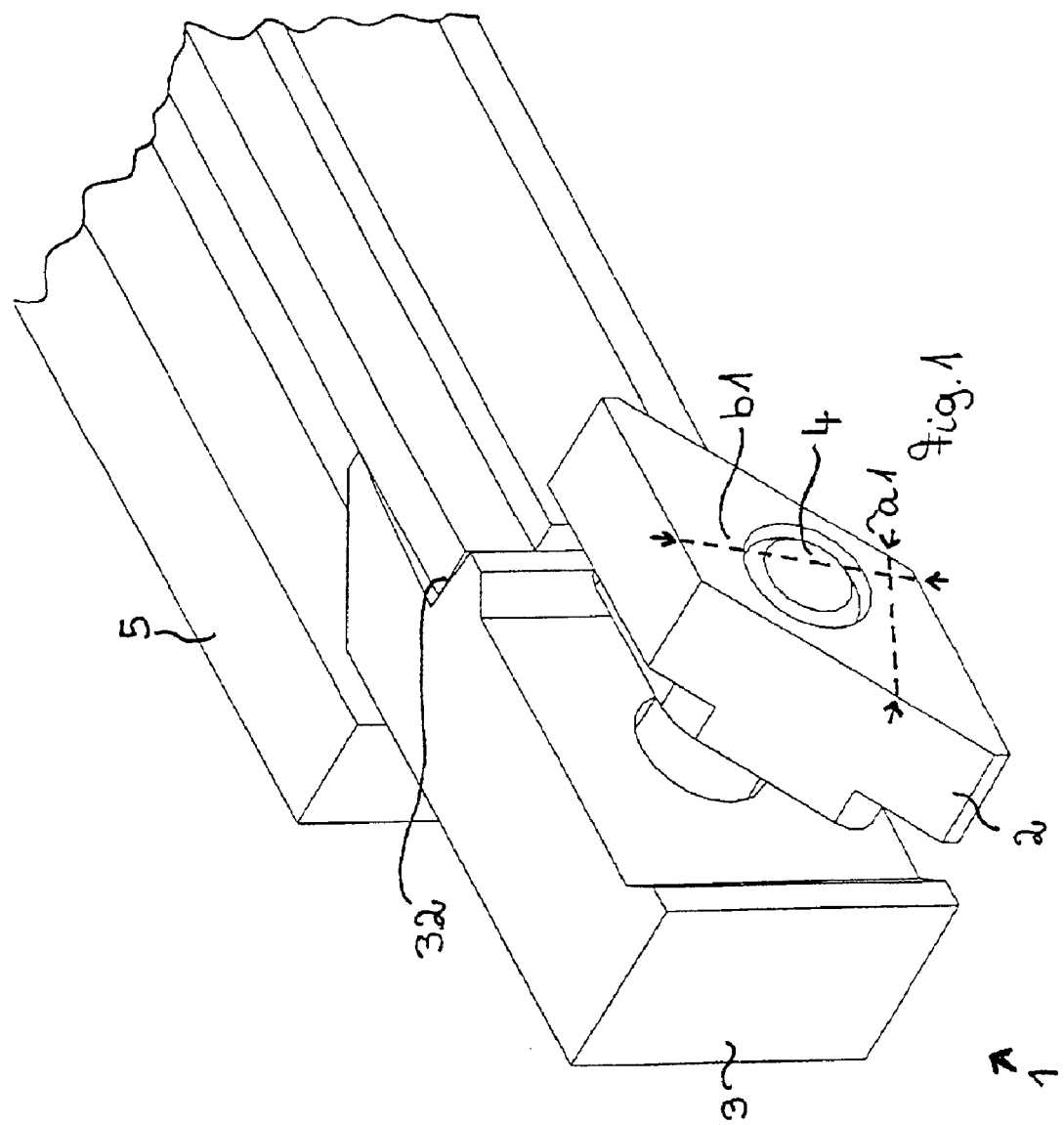
FIG. 1 A perspective view of a clamping element according to the invention with engaging cam rail.
Figure 3:
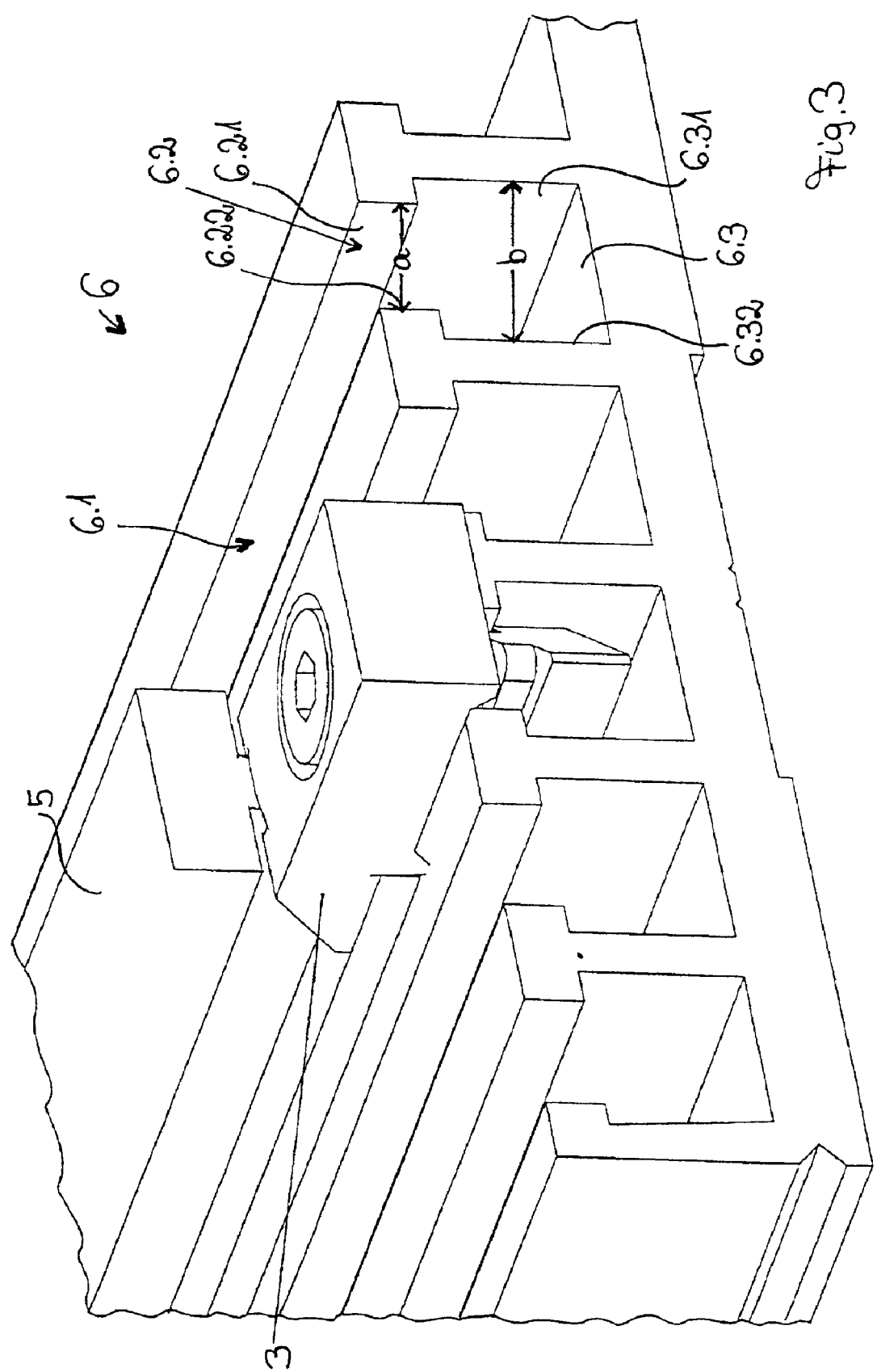
FIG. 3 A representation of the clamping element inserted in a grooved rail and fixed by means of a sliding block.
Figure 4:
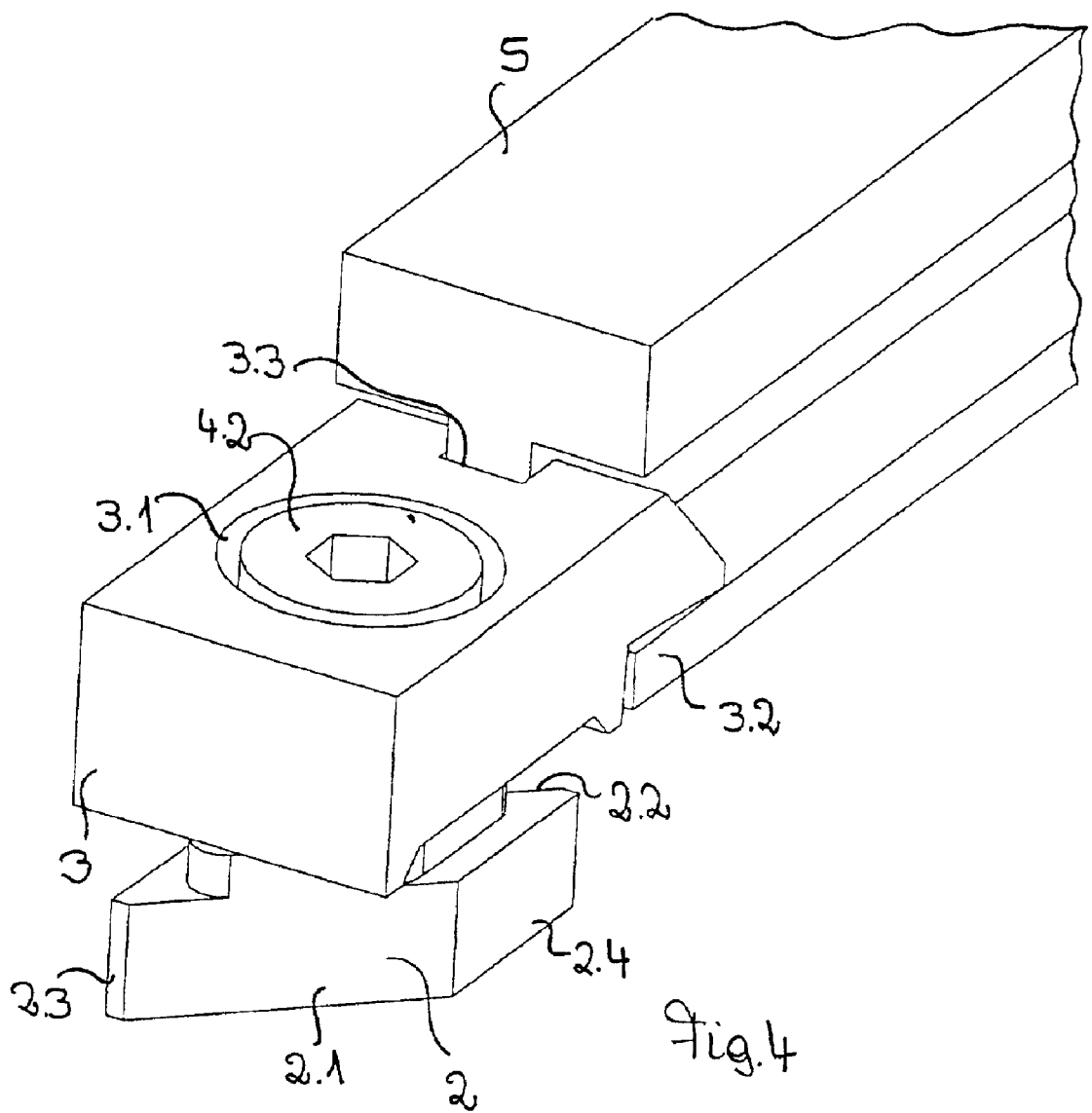
FIG. 4 A plan view of the clamping element of FIG. 1.

The clamping element shown in FIG. 1 has a blocking member 3 and a clamping screw 4 linking said two parts. The clamping screw 4, as can e.g. be gathered from FIGS. 3 to 5, is preferably constructed as a socket head cap screw, i.e. a screw having in its head 4.1 a hexagonal actuating recess 4.2. The head 4.1 is preferably placed in countersunk manner in a depression 3.1 of the blocking member 3 remote from the sliding block 2. The blocking member 3 has a vertical stop face 3.2. It is also provided on a side facing a cam rail 5 to be blocked by it with a groove 3.3 for the positive, lateral fixing of the cam rail 5. The sliding block 2 has in a plane perpendicular to the extension direction of the screw 4 a parallelogram cross-section, i.e. an overall parallelogram shape. Two first side surfaces 2.1, 2.2 of the sliding block 2 have a spacing a1. The two second parallel side surfaces 2.3, 2.4 have a larger spacing b1.

The grooved rails 6 are provided with undercut grooves 6.1, which have an insertion area 6.2 and following the latter a groove base 6.3. The width of the insertion area 6.2 is a and the width of the groove base is b, b being greater than a.

The spacing a1 of the first side surfaces 2.1, 2.2 of the sliding block 2 essentially corresponds to the width a of the insertion area 6.2 with a reduction falling within a tolerance range, so that the sliding block 2 can be inserted through the insertion area 6.2 of the sliding block into the groove 6.1, if its first side surfaces 2.1, 2.2 are parallel to the boundary walls 6.21, 6.22 of the insertion area 6.2 of groove 6.1.

The spacing b1 of the second side surfaces 2.3, 2.4 of the sliding block 2 substantially corresponds to the width b of the groove base 6.3, i.e. optionally also with a reduction falling within the tolerance range, so that in the groove base 6.3 the sliding block 2 can be pivoted into a position in which its second side surfaces 2.3, 2.4 are parallel to the side walls 6.31, 6.32 of the groove base 6.3.

Figure 2:
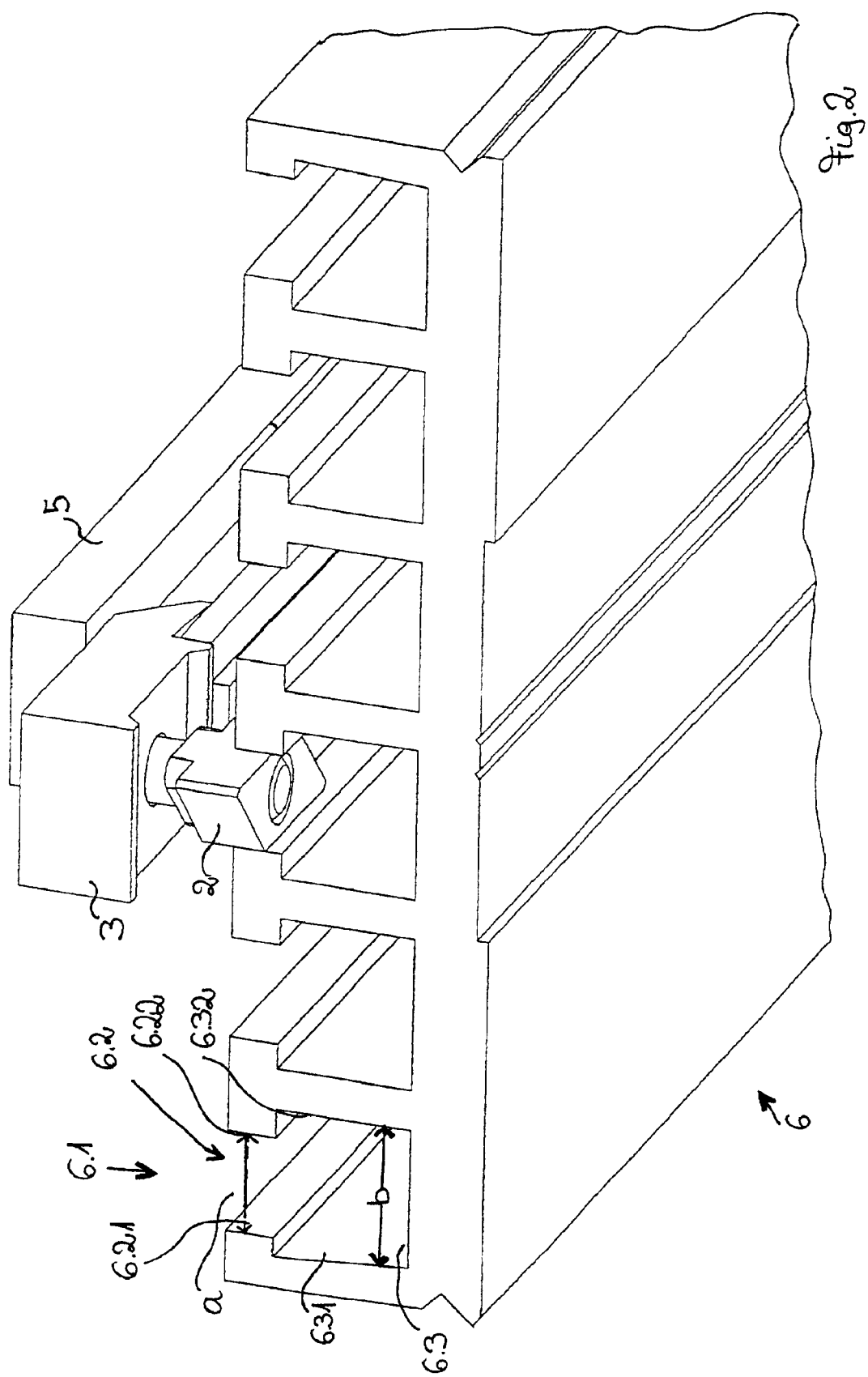
FIG. 2 A representation of the insertion of a sliding block of a clamping element in an undercut groove of a grooved rail.

As a result of the above-described parallelogram shape of the sliding block 2, in the case of a parallel orientation of its first side surfaces 2.1, 2.2 it can be inserted through the insertion area 6.2 into the groove 6.1 slightly perpendicular to the extension direction of the latter and as shown in FIG. 2. As soon as the sliding block arrives in the vicinity of the groove base 6.3 the screw 4 is turned, so that as a result of the fact that the sliding block is held in frictionally engaging manner on the screw 2 it is pivoted into a position in which its two side surfaces 2.3, 2.4 are parallel to the side walls 6.31, 6.32 of the groove base 6.3. On further screwing down the screw 2, as a result of the screwing action the sliding blocks are raised and are pressed from below against the undercuts of the undercut groove 1, whilst the blocking member is pressed from above against the rail-like projections forming the undercuts, so that the clamping element is firmly clamped to the grooved rail 6 and consequently, as shown in the drawings, inserted in its groove 3.3 and with its cam rail engaging on its vertical blocking wall 3.2 fixes the same securely to the grooved rail 6.

The cam rail 5 and blocking member 3 can, as shown, be constructed in two pieces, but can alternatively be constructed in one piece.

What is claimed is:

1. A clamping element, comprising:
 a machine part having a grooved rail with an undercut groove defining an insertion area and a groove base, the insertion area being narrower than the groove base;
 a parallelogram sliding block having side surfaces defining an insertion dimension, said sliding block being adapted to be arranged inside said groove of said grooved rail between said insertion area and said groove base thereof;

a cam rail having at least a lower rail part and a web extending at a right angle with respect to said lower rail part;

a blocking member connected to said sliding block, said blocking member being adapted to be arranged outside said groove of grooved rail on the opposite side of said insertion area of said groove with respect to said sliding block;

said blocking member having a stop face abutting at said cam rail for fixing said cam rail at said grooved rail of said machine part by at least locally overlapping said lower rail part for clamping said cam rail to said machine part with said lower rail part abutting said grooved rail and with said sliding block inserted into said groove base; wherein said blocking member is provided with a blocking member groove and wherein said cam rail has a protruding portion extending into said blocking member groove, said blocking member groove and said protruding portion are adapted to cooperate with each other for the positive lateral fixing of said cam rail to said blocking member.

2. A clamping element according to claim 1, wherein said side surfaces include first parallel side surfaces spaced apart by a distance substantially corresponding to a width of said undercut groove insertion area.

3. A clamping element according to claim 1, wherein said side surface include parallel side surfaces spaced apart by a distance substantially corresponding to a width of said groove base.

4. A device for fixing a cam rail to a machine part, the device comprising:

a grooved rail with an undercut groove defining an insertion area and a groove base, said grooved rail being connected to or part of said machine part, said insertion area being narrower than the groove base;

parallelogram sliding block having side surfaces defining an insertion dimension, said sliding block being arranged inside said groove of said grooved rail between said insertion area and said groove base thereof;

a cam rail having at least a lower rail part and a web extending at a right angle with respect to said lower rail part, said web having a grooved rail facing side and an opposite stop face;

a blocking member connected to said sliding block, said blocking member being arranged outside said groove of said grooved rail on the opposite side of said insertion area of said groove with respect to said sliding block, said blocking member having a stop face abutting at said cam rail stop face for fixing said cam rail at said grooved rail of said machine part by at least locally overlapping said lower rail part for clamping said cam rail to said machine part with said lower rail part abutting said grooved rail and with said sliding block inserted into said groove base, wherein said blocking member is provided with a blocking member groove and wherein said cam rail has a protruding portion extending into said blocking member groove, said blocking member groove and said protruding portion are adapted to cooperate with each other for the positive lateral fixing of said cam rail to said blocking member.

5. A device according to claim 4, wherein said side surfaces include parallel side surfaces spaced apart by a distance substantially corresponding to a width of said groove base.

6. A clamping arrangement for fixing a cam rail to a machine part, the clamping arrangement comprising:

a grooved rail with an undercut groove defining an insertion area and a groove base with side walls, said grooved rail being connected to or part of said machine part, said insertion area being narrower than the groove base;

a sliding block having first side surfaces defining an insertion dimension that is narrower than said groove base of said grooved rail and said sliding block having second side surfaces defining a fixation dimension, said sliding block being arranged inside said groove of said grooved rail between said insertion area and said groove base thereof, a cam rail with a lower rail part, a web extending at a right angle to said lower rail part, and a cam rail stop face, a blocking member connected to said sliding block, said blocking member being arranged outside said groove of said grooved rail on the opposite side of said insertion area of said groove with respect to said sliding block, said blocking member having a stop face abutting said cam rail stop face and having a protrusion at least locally overlapping said lower rail part for fixing said cam rail at said grooved rail of said machine part with said lower rail part abutting said grooved rail and with said sliding block inserted into said groove base with said second side surfaces engaging said side walls, wherein said blocking member is provided with a blocking member groove and wherein said cam rail lower part has a protruding portion extending into said blocking member groove said blocking member groove and said protruding portion providing a positive lateral fixing of said cam rail to said blocking member.

7. A clamping arrangement according to claim 6, wherein said side surfaces include first parallel side surfaces spaced apart by a distance substantially corresponding to a width of said undercut groove.

8. A clamping arrangement according to claim 6, wherein said side surfaces include parallel aide surfaces spaced apart by a distance substantially corresponding to a width of said groove base.

9. A device according to claim 4, wherein said cam rail lower part has said protruding portion extending into said blocking member groove.

* * * * *